UNITED STATES PATENT OFFICE.

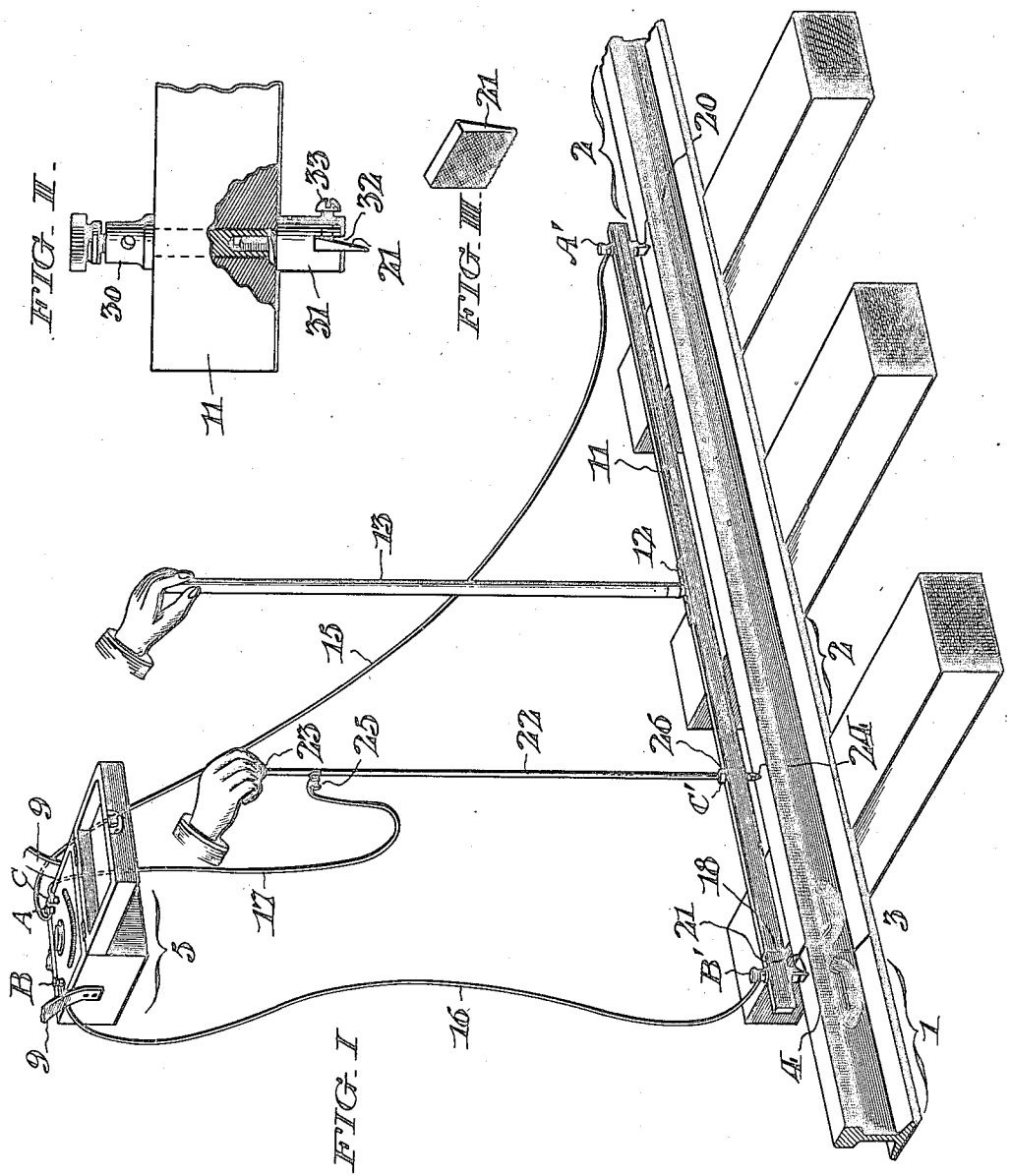

CHARLES E. VAWTER, OF PHILADELPHIA, PENNSYLVANIA.

RAIL-BOND TESTER.

1,426,620. Specification of Letters Patent. Patented Aug. 22, 1922.

Application filed October 10, 1919, Serial No. 329,743. Renewed July 10, 1922. Serial No. 573,920.

*To all whom it may concern:*

Be it known that I, CHARLES E. VAWTER, a citizen of the United States, residing in Philadelphia, in the county of Philadelphia and State of Pennsylvania, have invented certain new and useful Improvements in Rail-Bond Testers, whereof the following is a specification, reference being had to the accompanying drawings.

My invention relates to rail-bond testers and the like, and more especially to the portion of a testing set or equipment whereby electrical connection to the rail is made. It is my aim to provide an apparatus or device for this purpose that affords various advantages over the means hitherto employed,—such as convenience, quickness, and effectiveness in use; simplicity, ruggedness, and durability of construction; and ease and cheapness of manufacture. How these and other advantages can be secured in connection with my invention will appear from the description hereinafter of the best form of embodiment at present known to me, while its scope and essentials will be indicated in my claims. It will be understood, of course, that my invention is applicable to testing of the electrical conductivity or resistance of joints or connections in conductors other than rails.

In the drawings, Fig. I. is a perspective view of a testing set comprising a device constructed in accordance with my invention, illustrating its use in actual practice.

Fig. II. is a fragmentary elevation, on an enlarged scale, illustrating the details of a contact mounting.

Fig. III. is a perspective view of a contact member.

The most desirable and convenient method of testing rail-bonds is comparison of the electrical resistance of the bond or joint to be tested with that of a definite, standard length of unbroken, integral rail,—such joints being ordinarily considered satisfactory when their resistance does not exceed that of some three feet of rail. For this purpose, any suitable instrument or instruments may be used,—as, for example, the magnetically controlled differential type of instrument disclosed in my application Serial No. 314,273 filed in the U. S. Patent Office, July 30, 1919, and commercially known as the "Vawter indicating ohmmeter". This latter instrument ordinarily functions upon the divided circuit principle.

In using such an instrument for this purpose, the standard length of solid rail may be connected in one branch of its divided circuit, and the joint or bond to be tested in the other branch of said circuit. The scale of the instrument may advantageously be calibrated and marked to indicate the resistance of the joint in terms of feet of rail, instead of in ohms or any other ordinary unit; this affords the advantage that the scale readings of the instrument will be correct for rails (or other conductors) of any uniform cross-section or weight,—provided, of course, that the length of solid rail connected in the instrument circuit be always the same.

It is especially convenient and advantageous, however, to use a magnetically controlled differential ohmmeter type of instrument for this purpose according to the fall of potential method, comparing the joint to be tested with an immediately adjacent portion of one of the rail lengths or sections united thereby, and utilizing for this purpose only the current already flowing in the rail. This involves altering the ordinary connections of the "Vawter indicating ohmmeter" type of instrument in such a way that its two moving coils shall be connected in series with one another (instead of in parallel), and that one of them shall be in shunt with the joint and the other with the immediately adjacent portion of rail with which said joint is to be compared; (the two coils together will then be in shunt with the joint plus said adjacent portion of rail.) The resistances of the coil circuits of the instrument being equal and, naturally, very high in comparison with the joint and rail resistances, the currents in the coils will have the same ratio as the resistances of the joint and of the test portion of rail; and the deflection of the instrument can readily be made to indicate correctly the number of feet of rail to which the joint resistance is equivalent. This novel adaptation of the "Vawter indicating ohmmeter" type of instrument is more fully described in my application Serial No. 329,745, filed concurrently with this application.

In Fig. I, of the drawings, I have indicated two lengths 1 and 2 of rail abutting at the joint 3; these lengths may be electrically connected in any desired manner, as by a rail-bond conductor 4, suitably secured to each of them. The instrument 5 employed for testing the bonded joint 3 is shown as of the type above mentioned, and is provided with suitable terminals A, B, and C, for the connections from the rail to its two coil circuits,—A and B being the separate terminals of these coil circuits, and C their common terminal. This instrument may conveniently be suspended from the neck of the user by a strap 9.

The device for making the necessary electrical connections to the rail lengths 1 and 2 which forms the subject of my invention is here shown as comprising a bar 11 (of wood or other convenient material) provided with a screw socket or other convenient means 12 for detachably securing thereto a wooden handle 13 or the like for manipulating said bar. This bar 11 also has connective means A', B', and C', which are insulated from one another by the material of the bar or otherwise, and are electrically connected to the instrument terminals A, B, and C, by means of flexible leads 15, 16, and 17. In practice, the instrument terminals A, B, and C and the corresponding parts A', B', and C' are preferably marked with identical marks, to facilitate use of the apparatus by unskilled persons.

As here shown, the connective devices A', B' are mounted on the bar 11 at a suitable definite distance apart, such as four feet. The connective device C' is located intermediate the connective devices A', B' at such a point on the bar 11 that the distance between the points of contact of the devices A' and C' with the rail will be the standard length of three feet. It is desirable to have on the bar 11 a mark (such as the transverse line indicated at 18) which can be readily placed over the junction 3 of the rail lengths 1 and 2,—or over the centre of the bond 4, if the rail lengths be so welded that their junction is not readily distinguishable,—to insure proper use of the device by unskilled persons.

The connective devices A', B' carried by the rod 11 comprise suitably spaced electrical contact elements 20 and 21 for engaging the rail surface. This engagement is made by merely placing said contacts 20 and 21 on the rail surface and applying a firm pressure on the handle 13. The connective means at C' comprises a movable contact member having the form of a metal rod 22 with an insulating handle 23 at its upper end and a suitably hard conical contact element 24 at its lower end,—as well as a binding post 25 for the detachable securing thereto of the lead 17. The member 22, it will be understood, is movable into engagement with the rail independently of the bar-mounted contacts 20 and 21, but is located and guided in definite position relatively to said contacts 20 and 21 by means here shown as in the form of a metal sleeve 26 carried by and set into said bar. This additional independently movable contact member 22 serves the purpose of a reading key, so that none need be provided on the instrument 5. By independent manipulation of the member 22, its conical point 24 can be "ground" (as by rotary movement) into contact with the rail surface, even in spite of rust thereon.

Referring, now, to Fig. II, it will be seen that the connective device A' (and the device B' is of identically the same construction) comprises a metal binding post part 30 which extends through a hole in the rod 11, and serves for the detachable securing thereto of the lead 15. The lower end of this member 30 is tapped and threaded, and into it is screwed the shank of a metal member 31 shown as slotted at 32 for the reception of the detachably mounted contact element 21. This contact element 21 has the form of a thin steel wedge with its blunt end bearing against the bottom of the slot 32, and it is secured in said slot by a set screw 33,—which insures a good electrical connection. The contact element 21 may advantageously be formed of a length of steel file of appropriate original or suitably modified cross section,—preferably ground smooth on the side against which bears the screw 33. The file projections at the narrow edge or corner of the wedge afford a series or line of virtual point contacts with the rail surface. With suitable pressure on the handle 13 and some slight shifting of the contacts 20 and 21 back and forth on the rail, satisfactory contact can be secured even when the rail surface is rusty.

Good contact at the point 20, 21 and 24 is, of course, of considerable practical importance, in order that the measurements may not be vitiated by substantial contact resistances at these points.

Having thus described my invention, I claim:

1. A rail-bond testing device comprising a bar with suitably spaced electrical contacts for engaging the rail, an additional electrical contact member independently movable and manually adjustable for engagement with the rail, and means carried by said bar for locating and guiding said additional contact member in definite position relatively to said contacts of the bar.

2. A rail-bond testing device comprising a bar carrying: means for detachably mounting thereon suitably spaced electrical contacts, and for detachably connecting current leads to said contacts; socket means for detachably securing to the bar a handle rod for manipulating the same; and means for guiding an additional independently movable manually adjustable contact member and maintaining it in definite position lengthwise of said bar intermediate said contact mounting means.

3. A rail-bond testing device comprising a bar with suitably spaced file edge contacts for engaging the rail, an additional electrical contact member vertically movable and manually adjustable for engagement with the rail, and means carried by said bar for locating and guiding said additional manually movable contact member in definite position relatively to said file edge contacts.

In testimony whereof, I have hereunto signed my name at Philadelphia, Pennsylvania, this seventh day of October, 1919.

CHARLES E. VAWTER.

Witnesses:
JAMES H. BELL,
E. L. FULLERTON.